Dec. 27, 1927.
T. J. FEGLEY ET AL
1,653,762
CHUCK
Filed Feb. 12, 1925
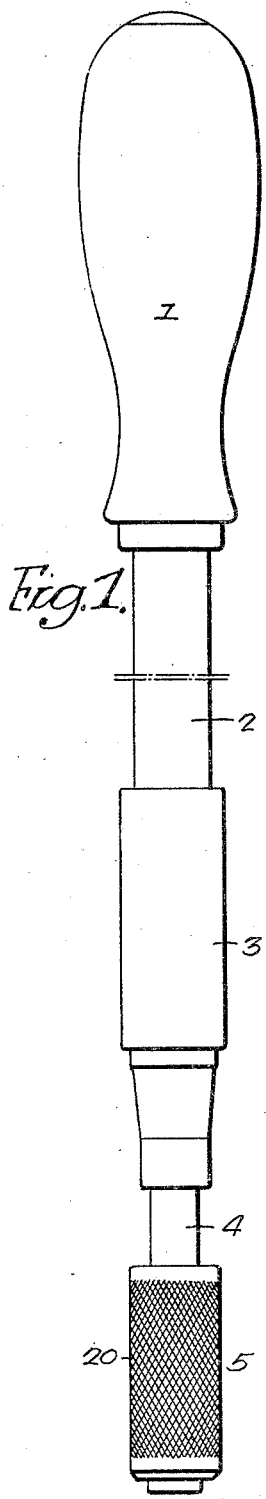
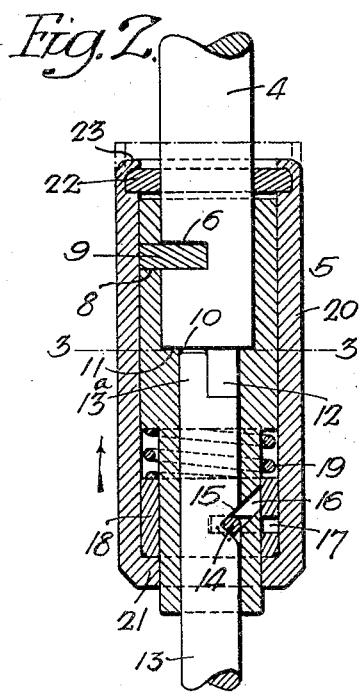
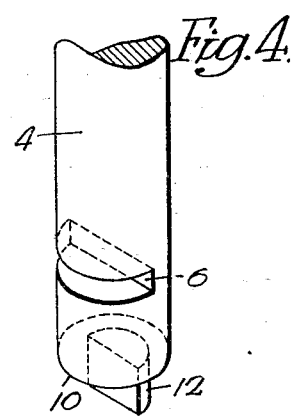
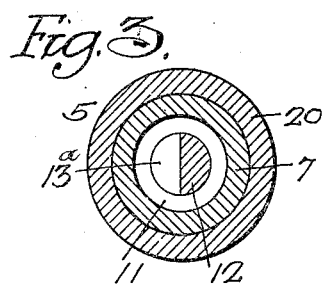
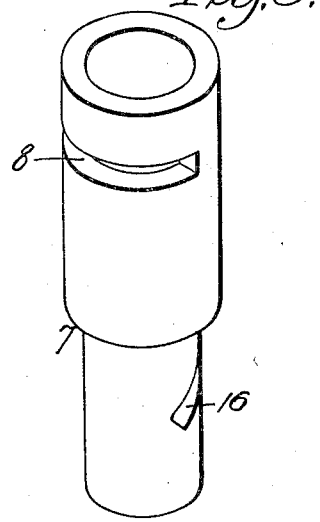
Inventors
Thomas J. Fegley,
George O. Leopold.
by their Attorneys
Howson & Howson Patented Dec. 27, 1927.

1,653,762

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

CHUCK.

Application filed February 12, 1925. Serial No. 8,813.

Our invention relates to certain improvements in chucks adapted for use in connection with screw drivers, drills, &c.

The object of the invention is to design a simple, effective and substantial chuck, especially adapted for use in connection with hand screw drivers and drills.

In the accompanying drawings:

Fig. 1 is a side view of a push screw driver, illustrating our improved chuck;

Fig. 2 is an enlarged sectional view of the chuck;

Fig. 3 is a plan view on the line 3—3, Fig. 2;

Figs. 4, 5 and 6 are detached perspective views of the chuck.

The screw driver illustrated in Fig. 1 is a push screw driver and has a handle 1, a tubular body portion 2, and a pawl carrier 3, which encloses the ratchet mechanism. The chuck 5 is attached to a spindle 4. While a screw driver of the push type is illustrated in connection with the chuck, it will be understood that the chuck can be applied to any form of screw driver, or drill. The spindle 4 has a transverse slot 6 and the body portion 7 of the chuck is slotted at 8. A key 9 is adapted to the said slots and secures the body portion to the spindle. The end of the spindle 4 is reduced to form a shoulder 10, which rests against an abutment 11 in the body portion. The reduced portion of the spindle is cut away to form a coupling member 12. The body portion 7 has an opening in which is inserted the bit 13 of a screw driver, or drill. The end 13ª of the bit is shaped similarly to the reduced coupling member 12 of the spindle so that, when the parts are in engagement, the spindle turns positively with the bit.

In order to hold the bit in engagement with the spindle, a roller 14 is provided, which rests in a notch 15 in the bit. The roller extends through a diagonal slot 16 in the body portion 7 and into a transverse slot 17 in a sleeve 18. This sleeve is arranged to slide on a reduced portion of the body 7. A spring 19, which is located between the body portion and the sleeve, tends to project the sleeve so as to retain the roller 14 in the locking position.

Enclosing the body portion and sleeve is a casing 20, which has an inturned flange 21 at its outer end that limits the movement of the sleeve 18. The inner end of the casing is reduced to receive a collar 22, which rests between a shoulder on the casing and the flange 23, which is bent over the collar, as illustrated in Fig. 2. The casing 20 also retains the key 9 in position.

When it is necessary to replace a bit, the casing 20 is moved in the direction of the arrow, Fig. 2, to compress the spring 19. This movement causes the roller 14 to travel away from the bit 13 and up the diagonal slot 16. When the roller is clear of the notch 15 in the bit, the bit can be removed from the chuck. The same operation is repeated, when a bit is inserted in the chuck.

The construction hereinbefore described makes a very effective chuck for holding screw driver and drill bits.

We claim:

The combination in a chuck, of a spindle; a body portion mounted on the spindle; a transverse key securing the body portion to the spindle; a casing enclosing the body portion having an inturned flange at its outer end, and having an internal groove at its inner end beyond the body portion; a collar mounted in the groove of the casing and extending over the inner end of the body portion; a sleeve located between the body portion and the inturned flange of the casing; and means for engaging a bit inserted in the chuck.

THOMAS J. FEGLEY.
GEORGE O. LEOPOLD.